United States Patent [19]

Zampini et al.

[11] Patent Number: 4,468,501

[45] Date of Patent: Aug. 28, 1984

[54] CROSS-LINKED POLYPHENYLENE OXIDE

[75] Inventors: Anthony Zampini, St. Louis; Raymond F. Malon, Edmundson, both of Mo.

[73] Assignee: Monsanto Company, St. Louis, Mo.

[21] Appl. No.: 509,627

[22] Filed: Jun. 30, 1983

[51] Int. Cl.³ .............................................. C08G 65/48
[52] U.S. Cl. ........................................ 525/390; 55/16; 55/158; 210/500.2
[58] Field of Search ................................ 525/390, 905

[56] References Cited

U.S. PATENT DOCUMENTS

| | | | |
|---|---|---|---|
| 3,262,892 | 7/1966 | Hay | 260/2.2 |
| 3,306,874 | 2/1967 | Hay | 260/47 |
| 3,306,875 | 2/1967 | Hay | 260/47 |
| 3,330,806 | 7/1967 | Borman | 260/47 |
| 3,334,069 | 8/1967 | Borman | 260/47 |
| 3,337,499 | 8/1967 | Bussink et al. | 260/47 |
| 3,375,298 | 3/1968 | Fox | 260/830 |
| 3,396,146 | 8/1968 | Schmukler | 260/47 |
| 3,406,147 | 10/1968 | Schmukler | 260/47 |
| 3,630,900 | 12/1971 | van der Voort | 525/390 |
| 3,729,433 | 4/1973 | Bilow | 525/390 |
| 3,780,496 | 12/1973 | Ward et al. | 55/16 |
| 3,875,114 | 4/1975 | Swiger | 525/390 |
| 4,230,463 | 10/1980 | Henis et al. | 59/14 |
| 4,321,331 | 3/1982 | Widiger, Jr. | 525/379 |

FOREIGN PATENT DOCUMENTS 31730  7/1979  European Pat. Off.

*Primary Examiner*—Christopher A. Henderson
*Attorney, Agent, or Firm*—Thomas E. Kelley; Henry Croskell

[57] ABSTRACT

Cross-linked polyphenylene oxide compositions comprise the reaction product of an alkyl halogenated phenylene oxide polymer and ammonia. The cross-linkage between phenylene groups is benzyl amine linkage represented by the structural formula —$CH_2NHCH_2$—. The cross-linked polyphenylene oxide is useful as a membrane.

6 Claims, No Drawings

CROSS-LINKED POLYPHENYLENE OXIDE

BACKGROUND OF THE INVENTION

This invention relates to cross-linked polyphenylene oxide compositions. More particularly, it relates to such compositions where polyphenylene oxide chains are cross-linked with benzylamine bonding provided by reaction with ammonia.

The polyphenylene oxides are a body of thermoplastics disclosed in U.S. Pat. Nos. 3,306,874 and 3,306,875, incorporated herein by reference. They are characterized by a unique combination of chemical, physical and electrical properties over a temperature range of more than 600° F., extending from a brittle point of minus 275° F. to a heat distortion temperature of 375° F. In particular, the polyphenylene oxides combine high tensile strength and tensile modulus with a high softening temperature, and excellent resistance to water, steam, strong acids and alkalies.

Some polyphenylene oxides also exhibit exceptional transport properties making them useful as membranes for separation processes such as ion exchange, ultra filtration, reverse osmosis, pervaporation and even gas permeation.

However, the polyphenylene oxides also have certain undesirable characteristics that are common to most thermoplastic materials. For example, their resistance to most common organic solvents is low. Aromatic and chlorinated hydrocarbon solvents dissolve phenylene oxide polymers, while other solvents and solvent vapors induce crazing in molded polyphenylene oxide parts under stress, causing loss of strength. The tensile properties of the resins decrease steadily with increasing temperature, and drop off sharply at about 200° C. Further, under extreme prolonged stresses, molded parts formed from the polyphenylene oxides tend to creep, causing permanent deformation.

It is known that these disadvantages which are common to most thermoplastic materials, may be overcome by cross-linking the individual polymer molecules during, or after, the forming of the material into its final shape. Thus, if a sufficient number of cross-linking sites are present, the material can be cross-linked and will then no longer be soluble, but only swell to a greater or lesser extent. Also, while the phenomenon of solvent crazing is not fully understood, it appears to involve crystallization of the polymer molecules. As the mobility of the polymer molecule is limited by cross-linking, crystallization is no longer possible, and thus the problem of solvent crazing is removed. The limitation on molecular mobility also prevents the polymer from flowing, even above its melting point, the preventing, to a large degree, creep and loss of tensile properties at increased temperature.

The polyphenylene oxides are, to a high degree, chemically inert, a desirable characteristic from a materials standpoint. However, because of this inertness the prior art has experienced difficulty in introducing cross-links between polymer chains, and structurally different units generally, by simple chemical processes. For example, prolonged heating in air will render the polymer insoluble in aromatic or chlorinated hydrocarbon solvents, but the degree of cross-linking accomplished is quite low, and the materials produced swell to a considerable degree.

Cross-linked polyphenylene oxides have been disclosed by Borman in U.S. Pat. No. 3,330,806 and by Schmukler in U.S. Pat. No. 3,406,147. Borman disclosed a cross-linkable polyphenylene oxide without the disadvantages of degradation and brittleness resulting from heat-induced cross-linking by introducing hydroxyl radicals into the polyphenylene oxide resin. The hydroxyl substituted polyphenylene oxide could then be cross-linked by reaction, for instance with a formaldehyde-releasing substance such as hexamethylenetetramine. Schmukler attempted to overcome deficiencies in cross-linked polyphenylene oxides by providing a plurality of side chain acyloxy groups on the polymer chain. Cross-linking could then be induced at elevated temperatures by aromatic substitution in the presence of a Lewis acid or by transesterification with a difunctional material reactive with the acyloxy group. A disadvantage of such cross-linked polyphenylene oxides as disclosed by Borman or Schmukler is that the cross-linked resin comprises by-products of the cross-linking reaction which are detrimental to the utility of such cross-linked resins for gas permeation purposes.

Ward et.al. in U.S. Pat. No. 3,780,496 disclose sulfonated polyxylelene oxide membranes for use in gas separations where the hydrogen ion form of the sulfonate substituent can be converted to a metal counter ion form. Ward et.al. disclose that such membranes have some utility in gas separation. A principal disadvantage is that the presence of water can be detrimental in membrane formation. Accordingly, the preparation of such membranes in a water-based coagulating system is impractical.

SUMMARY OF THE INVENTION

The present invention provides a cross-linked phenylene oxide polymer composition comprising the reaction product of an alkyl halogenated phenylene oxide polymer and ammonia. Preferred cross-linked phenylene oxide polymer compositions include the reaction product of brominated poly(2,6-dimethyl-1,4-phenylene oxide) and ammonia where there are from 0.01 to 2.0 benzylic bromine atoms per phenylene oxide unit. Such cross-linked phenylene oxide polymer compositions have cross-linkage between phenyl groups represented by the structural formula $-CH_2NHCH_2-$.

DESCRIPTION OF THE PREFERRED EMBODIMENTS

This invention provides cross-linked phenylene oxide polymer compositions comprising the reaction product of an alkyl halogenated phenylene oxide polymer and ammonia. The alkyl halogenated phenylene oxide polymer which is useful in such a cross-linked phenylene oxide polymer composition will generally have at least one alkyl group on each phenylene ring. The alkyl group can vary in size and may have from 1 to 3 carbon atoms or more. In most cases there will be two alkyl groups on each phenylene ring with both alkyl groups being in an ortho position with respect to the oxygen of the phenylene oxide. When there are more than one carbon atoms in the alkyl group attached to the phenylene ring the akly groups are preferably halogenated at the benzylic carbon atom which is that carbon atom of the alkyl group which is attached to the phenylene ring. In preferred halogens are chlorine and bromine. The preferred alkyl group attached to the phenylene ring is the methyl group. The most preferred alkyl halogenated phenylene oxide polymer is a brominated polymer of 2,6-dimethyl-1,4-phenylene oxide.

In order for cross-linking reaction to occur between the alkyl halogenated phenylene oxide polymer and ammonia it is not necessary that an active halogen atom be attached to each alkyl group of any polymer. In this regard it is often adequate for formation of the cross-linked phenylene oxide polymer composition that there be sufficient bromine atoms per phenylene oxide unit such that the cross-linking reaction can occur. In this regard haloalkyl substituted phenylene oxide polymer is useful in the cross-linking reaction when there are from 0.01 to 2.0 benzylic halogen atoms per phenylene oxide unit. Cross-linking reactions also readily occur when there are more than 2.0 benzylic halogen atoms per phenylene oxide unit. Preferably the alkyl halogenated phenylene oxide polymer will comprise from 0.01 to 2.0 benzylic bromine atoms per phenylene oxide unit of poly(2,6-dimethyl-1,4-phenylene oxide). More preferably there will be from about 0.2 to about 1.2 benzylic bromine atoms per phenylene oxide unit.

The cross-linked phenylene oxide polymer compositions of this invention will have cross-linkage between phenylene groups represented by the structural formula —CHR—NH—CHR—, where R is hydrogen or an alkyl. When the polymer composition of this invention is a cross-linked substituted polymer of 2,6-dimethyl-1,4-phenylene oxide the cross-linkage between phenylene groups is represented by the structural formula —CH$_2$NHCH$_2$—.

The cross-linked phenylene oxide polymer compositions of this invention are useful wherever it is desirable to utilize a polyphenylene oxide having resistance to organic solvents and improved physical properties. A preferred use for such cross-linked polyphenylene oxide polymer composition is as a membrane, for instance a selectivity permeable gas separation membrane. Such membranes can be provided in either film or hollow fiber form.

FORMATION OF HALOGENATED POLYPHENYLENE OXIDE

A preferred method of forming the polyphenylene oxide precursor having halogenated alkyl groups substituents is to halogenated an alkylated polyphenylene oxide. Such alkylated polyphenylene oxides can comprise a poly(2,6-dialkyl-1,4-phenylene oxide), such as a poly(2,6-dimethyl-1,4-phenylene oxide). Halogenation of the alkyl group occurs generally at the benzylic carbon.

The halogenation can be effected by addition of a halogen to a solution of the polyphenylene oxide in a solvent, for instance a hlaogenated solvent, such as chlorobenzene. The preferred halogenating agents include chlorine, bromine, chlorine-producing compounds and bromine-producing compounds. The halogenating agent is added to the solution of polyphenylene oxide under conditions to control halogenation. Halogenation will tend to occur by free radical reaction at higher temperatures. Under such free radical reaction halogen will be added to the benzylic carbon. Halogenation tends to occur by electrophilic substituion at lower temperatures. Under such electrophilic substitution the halogen is added to the aromatic ring. For instance, in the bromination of a solution of poly(2,6-dimethyl-1,4-phenylene oxide) in chlorobenzene by the addition of bromine, electrophilic substitution predominates at lower temperatures, for instance temperatures lower than about 80° C., and free radical substitution predominates at higher temperatures, for instance under reflux conditions at temperatures of about 130° C. Halogenation by both free radical substitution and electrophilic substitution can occur at intermediate temperatures.

In some instances it may be desired to conduct halogenation under conditions under which free radical substitution predominates to produce a polyphenylene oxide precursor with halogen primarily on a benzylic carbon. In other instances it may be desirable to provide a polyphenylene oxide precursor with some halogen directly substituted onto the aromatic ring. Such halogen substituted onto the aromatic ring does not freely react in subsequent cross-linking operations but may provide desirable properties, for instance, for membrane gas separation.

The halogenated polyphenylene oxide precursor can be recovered by precipitation in a non-solvent, for instance such as methanol. Other recovery steps include filtration washing with such non-solvent and drying for instance at elevated temperatures and reduced pressures.

CROSS-LINKING OF HALOGENATED POLYPHENYLENE OXIDE

The halogenated polyphenylene oxide can be cross-linked before or after forming the halogenated polyphenylene oxide into a useful form. In many cases it is desirable to crosslink the preformed article of the halogenated polyphenylene oxide. The crosslinking reaction can be effected with ammonia as the cross-linking agent. The ammonia can be utilized either in gaseous form or in a liquid form, for instance as a solution of ammonia. Such solutions can be aqueous solutions of ammonia or organic solutions of ammonia.

Cross-linking can be effected by any means of contacting the crosslinking agent with active halogen on the halogenated polyphenylene oxide membrane under conditions which do not deleteriously effect the preformed structure of the polymer. In the case of cross-linking with ammonia gas it is generally sufficient to expose the halogenated polyphenylene oxide membranes to the ammonia gas, for instance in a confined space. Exposure at mild conditions, for instance ambient temperature and atmospheric pressure, are often sufficient to effect adequate crosslinking. Cross-linking can be effected to a higher degree by employing more severe reaction conditions, for instance higher pressure and/or higher temperature.

In the case of cross-linking of halogenated polyphenylene oxide membranes with solutions of cross linking agent, for instance aqueous solutions of ammonia, effective cross-linking can often be obtained by simply soaking the halogenated polyphenylene oxide membrane in the solution for a reasonable time. Of course more extensive cross-linking can be effected by utilizing more severe reaction conditions, for instance higher temperatures.

The invention is further illustrated by, but not limited to, the following examples.

EXAMPLE 1

This example demonstrates the use of bromine as the brominating agent for a polyarylene oxide.

250 g of poly(2,6-dimethyl-2,4-phenylene oxide) having an intrinsic viscosity of 0.508 dl/g, as measured in chloroform at 25° C., was dissolved in 3,200 ml of chlorobenzene in a reactor consisting of a 5 liter 3-neck Morton flask equipped with a mechanical stirrer, addition funnel and a condenser having an acid water trap. The solution was heated via oil bath to boiling and dried by removing 200 ml of distillate. To the boiling solution, 250 g of bromine was added over four hours. The solution was allowed to boil for an additional 30 minutes under a nitrogen sweep. After cooling, the solution was sprayed into 15 liters of methanol to precipitate the halogenated polymer. The halogenated polymer was collected on a filter, washed with methanol and dried at 50° C. under reduced pressure. The yield was 339.5 grams (90 percent of theoretical). The halogenated polymer had a total bromine content of 31.4 percent by weight. Calculations from the integral curve of the proton magnetic resonance spectra of the halogenated polymer showed that bromine was substituted at benzylic carbons at a level of 0.6 bromine per phenylene oxide unit and that bromine was substituted into the aromatic ring at the level of 0.08 bromine per phenylene oxide unit.

EXAMPLE 2

This example demonstrates the use of N-bromosuccinimide as the brominating agent.

11.4 g of poly(2,6-dimethyl-1,4-phenylene oxide), having an intrinsic viscosity of 0.50 dl/g, as measured in chloroform at 25° C., was dissolved in 410 ml of chlorobenzene in a 500 ml 3-neck round bottom flask equipped with a mechanical stirrer, condenser having an acid water trap and a nitrogen inlet tube. Using an oil bath, the polymer solution was heated to 115° C. 16.9 g of N-bromosuccinimide were added. While under nitrogen, the reaction mixture was allowed to boil until bromine was no longer observed in the vapor phase over the reaction medium. After cooling to ambient temperature, the reaction mixture was filtered and the product precipitated in methanol. The halogenated polymer was collected, washed with methanol and air dried on the filter. The halogenated polymer was dissolved in 120 ml chloroform and reprecipitated in methanol. Finally, the halogenated polymer was dried four days at 50° C. in a vacuum oven. The yield was 12.0 g (63 percent theoretical). The total bromine content of the halogenated polymer was 36.8 percent by weight. Calculations based on the integral curve of the nuclear magnetic resonance spectra showed that the halogenated polymer was substituted with bromine at the benzylic carbon at a level of 0.65 bromine per phenylene oxide unit and substituted with bromine at the aromatic ring at a level of 0.22 bromine per phenylene oxide unit.

EXAMPLE 3

This example demonstrates a general procedure for introducing bromine at both the aryl and benzylic position of PPO a polyarylene oxide.

30 g of poly(2,6-dimethyl-1,4-phenylene oxide) having an intrinsic viscosity of 0.508 dl/g, as measured in chloroform at 25° C., was dissolved in 450 ml of chlorobenzene in a reactor consisting of a 1000 ml 3-neck round bottom flask equipped with an addition funnel, a mechanical stirrer and a condenser having an acid water trap and a thermometer. Bromine was substituted into the polymer principally at the aromatic ring (aryl bromination) by adding 42 g of bromine over 15 minutes while the solution was maintained at 66°–72° C. The aryl brominated polymer solution was heated to reflux, at a temperature of about 130° C. Under reflux, a condition favorable to benzylic bromination, 22 g of bromine was added over 30 minutes. After reflux for 10 minutes, about 20 percent of the solvent was distilled from the reaction solution. The solution was cooled and the halogenated polymer precipitated in methanol. The halogenated polymer was washed with methanol and dried at 55° C. for five days in a vacuum oven. The yield was 61.5 g (99 percent of theoretical). The halogenated polymer had a total bromine content of 49.3 percent by weight. Calculations based on nuclear magnetic resonance analysis showed that the halogenated polymer was substituted with bromine at benzylic carbon at a level of 0.88 bromine per phenylene oxide unit and substituted with bromine in the aromatic ring at a level of 0.56 bromine per phenylene oxide unit. That is, the benzylic halogen level was 0.88 and the aryl halogen level was 0.56.

EXAMPLE 4

This example demonstrates an alternate method of preparing an aryl-benzylic brominated polyarylene oxide as well as the importance of reaction temperature on bromine distribution in the product.

In this example, 30 g of poly(2,6-dimethyl-1,4-phenylene oxide) having a weight average molecular weight, $\overline{M}w$, of 49,000 was dissolved in 450 ml chlorobenzene in a reactor consisting of a 1000 ml 3-neck round bottom flask equipped as in Example 3. The solution was heated to 115° C. 40 g of bromine was added over 20 minutes. The solution was kept at 115° C. for an additional 30 minutes, then cooled to room temperature. The halogenated polymer was precipitated in methanol, washed with methanol and dried at 50° C. in a vacuum oven. The yield was 48.7 g (97.4 percent of theoretical). The halogenated polymer had total bromine content of 38.98 percent by weight. Nuclear magnetic resonance showed that the halogenated polymer had a benzylic halogen level of 0.38 and an aryl halogen level of 0.6.

EXAMPLES 5–10

These examples illustrate the flexibility in introducing bromine at various levels at the aryl and benzylic positions of a polyarylene oxide.

Aryl brominated poly(2,6-dimethyl-1,4-phenylene oxide) was produced as in Example 3. Benzylic halogenation was also carried out as in Example 3 except that the amount of bromine added to the aryl brominated polymer solution at reflux was varied. The variations in benzylic halogenation are illustrated in Table I.

TABLE I

| Example | Grams of Br$_2$ Added to Aryl Brominated Polymer Solution at Reflux | Yield (g) | (% theoretical) | Bromine (Wt %) | Bromine Distribution/ Arylene Unit Aryl | Benzylic |
|---|---|---|---|---|---|---|
| 5 | 4.0 | 53 | 100 | 42.6 | 0.92 | 0.19 |
| 6 | 10.0 | 54 | 96 | 44.7 | 0.90 | 0.30 |
| 7 | 16.0 | 56 | 95 | 46.7 | 0.89 | 0.41 |
| 8 | 34.0 | 67 | 99 | 52.9 | 0.91 | 0.75 |
| 9 | 42.0 | 72 | 100 | 55.4 | 0.90 | 0.94 |

TABLE I-continued

| Example | Grams of Br$_2$ Added to Aryl Brominated Polymer Solution at Reflux | Yield (g) | Yield (% theoretical) | Bromine (Wt %) | Bromine Distribution/ Arylene Unit Aryl | Bromine Distribution/ Arylene Unit Benzylic |
| --- | --- | --- | --- | --- | --- | --- |
| 10 | 54.5 | 77 | 98 | 58.3 | 0.89 | 1.18 |

EXAMPLE 11

This example illustrates cross-linking of dense film membranes of halogenated polyarylene oxide.

A halogenated polyarylene oxide polymer was produced as in Examples 5–10 where the polyarylene oxide was poly(2,6-dimethyl-1,4-phenylene oxide). The polyarylene oxide was brominated to a level of 33.4 percent by weight and had a benzylic bromine level of 0.56 and an aryl bromine level of 0.19.

The brominated polyarylene oxide was dissolved in chloroform to produce a clear solution from which a dense film could be cast. The solution comprised about 5 to 10 percent by weight polymer. The solution was filtered through a fritted glass filter with a nominal maximum pore size of 40 to 60 μm and evenly poured across one end of a 17.5×25.5 cm glass plate. A casting knife (doctor blade) was drawn the length of the plate. The cast solution was placed in a vacuum oven and dried for two hours at room temperature under reduced pressure (250–500 mmHg). The dense film was released from the glass plate surface in a deionized water bath and further dried in a vacuum oven (at 50°–80° C.; 250 mmHg) for a period in excess of one day.

A disk having a cross-sectional area of about 10.5 cm$^2$ was cut from the dense film. The disk was mounted in a permeation test cell. Intrinsic permeabilities and intrinsic separation factors were calculated from permeation analysis using gas mixtures of H$_2$/CO, H$_2$/CH$_4$, CO$_2$/CH$_4$, O$_2$/N$_2$. The first named gas, i.e., H$_2$, CO$_2$ and O$_2$, were present at levels in the range of about 20–25 percent by volume. The permeabilities and separation factors are listed in Table II.

EXAMPLES 12–15

Disks were cut from the dense film membrane of aryl-benzylic brominated poly(2,6-dimethyl-1,4-phenylene oxide) of Example 11. The disks had a cross-sectional area of 10.5 cm$^2$. The brominated polyarylene oxide was cross-linked by immersing the disks in a solution of about 30 percent by weight aqueous ammonia for a period in the range of 26 hours to 11 days. The temperature of the aqueous ammonia solution ranged from 23° C. to 60° C. The cross-linked membranes were washed with deionized water for at least 16 hours and then dried at 60°–80° C. in a vacuum oven. The covalently bonded, cross-linked polyarylene oxide membranes were not soluble in chloroform and did not swell appreciably in chloroform.

The disks of covalently-bonded, cross-linked polyarylene oxide membranes were subjected to permeation analysis as in Example 11. The intrinsic permeation properties—permeability and separation factor—were determined and are listed in Table II. In general permeability of the cross-linked polymer is substantially higher than the permeability of the halogenated precursor.

TABLE II

| Example | Cross-linking Treatment | Intrinsic Permeability* P$_{H2}$ | Intrinsic Permeability* P$_{CO2}$ | Intrinsic Permeability* P$_{O2}$ | Separation Factor αH$_2$/CO | Separation Factor αH$_2$/CH$_4$ | Separation Factor αCO$_2$/CH$_4$ | Separation Factor αO$_2$/N$_2$ |
| --- | --- | --- | --- | --- | --- | --- | --- | --- |
| 11 | None | 22 | 8 | 2.3 | 37 | 55 | 22 | 5.4 |
| 12 | 26 hr at 23° C. | 32 | — | — | 31 | 61 | — | — |
| 13 | 36 hr at 23° C. | 47 | 21 | — | 31 | 68 | 28 | — |
| 14 | 108 hr at 23° C. | 55 | 20 | 6.5 | 26 | 45 | 28 | 5.5 |
| 15 | 96 hr at 60° C. | 104 | 42 | 13.7 | 22 | 34 | 35 | 4.9 |

*Intrinsic permeability is measured in units of $10^{-8}$ cc cm/cm$^2$-sec-cmHg.

The foregoing description of embodiments of this invention is not intended to be a limitation to the scope of this invention. As will be apparent to those skilled in the art, many variations and modifications can be made to the compositions of this invention as described in the above embodiments without departing from the spirit and scope of this invention.

We claim:

1. A cross-linked phenylene oxide polymer composition comprising the reaction product of an alkyl halogenated phenylene oxide polymer and ammonia, wherein cross-linkage between phenylene groups is represented by the structural formula —CHRNHCHR—, where R is hydrogen or an alkyl.

2. The composition of claim 1 wherein the phenylene oxide polymer has at least one alkyl group having 1 to 3 carbon atoms, said alkyl groups being in an ortho position on the phenylene ring with respect to the oxygen of the phenylene oxide.

3. The composition of claim 2 wherein said at least one alkyl group is halogenated at the benzylic carbon atom.

4. The composition of claim 3 wherein the phenylene oxide has two methyl groups.

5. The composition of claim 4 wherein the methyl groups are halogenated with chlorine or bromine.

6. A cross-linked phenylene oxide polymer composition comprising the reaction product of brominated poly(2,6-dimethyl-1,4-phenylene oxide) and ammonia wherein there are from 0.1 to 2.0 benzylic bromine atoms per phenylene oxide unit, wherein there is benzyl amine cross-linkage between phenylene groups represented by the structural formula —CH$_2$NHCH$_2$—.

* * * * *